(12) United States Patent
McLeod et al.

(10) Patent No.: US 10,530,825 B2
(45) Date of Patent: *Jan. 7, 2020

(54) CATCHING UP TO THE LIVE PLAYHEAD IN LIVE STREAMING

(71) Applicant: Amazon Technologies, Inc., Seattle, WA (US)

(72) Inventors: Euan McLeod, Columbia, MO (US); Marc Joliveau, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

This patent is subject to a terminal disclaimer.

(21) Appl. No.: 15/170,164

(22) Filed: Jun. 1, 2016

(65) Prior Publication Data

US 2017/0353518 A1 Dec. 7, 2017

(51) Int. Cl.
*H04L 29/06* (2006.01)

(52) U.S. Cl.
CPC ............ *H04L 65/604* (2013.01); *H04L 65/80* (2013.01)

(58) Field of Classification Search
CPC .... H04L 65/604; H04L 65/4069; H04L 65/80
USPC ......................................................... 709/219
See application file for complete search history.

(56) References Cited

U.S. PATENT DOCUMENTS

| | | | |
|---|---|---|---|
| 7,237,254 B1 * | 6/2007 | Omoigui | H04N 7/17318 348/E7.071 |
| 8,875,208 B1 * | 10/2014 | Abkairov | H04L 65/60 725/115 |
| 9,124,673 B2 | 9/2015 | Somayazulu et al. | |
| 10,091,265 B2 | 10/2018 | McLeod et al. | |
| 2002/0186768 A1 * | 12/2002 | Dimitrova | H04N 21/235 375/240.12 |
| 2008/0165396 A1 * | 7/2008 | Brodersen | G11B 19/025 358/509 |
| 2011/0080940 A1 | 4/2011 | Bocharov et al. | |
| 2011/0246657 A1 * | 10/2011 | Glow | H04L 65/1063 709/231 |
| 2013/0163579 A1 | 6/2013 | Yadav | |
| 2015/0082349 A1 * | 3/2015 | Ishtiaq | H04N 21/23418 725/40 |
| 2015/0110474 A1 * | 4/2015 | Chen | H04L 65/4092 386/345 |
| 2015/0126169 A1 | 5/2015 | Kerger et al. | |

(Continued)

FOREIGN PATENT DOCUMENTS

WO WO2017/210027 12/2017

OTHER PUBLICATIONS

U.S. Appl. No. 15/170,169, filed Jun. 1, 2016, McLeod, et al.

(Continued)

*Primary Examiner* — Joseph L Greene
(74) *Attorney, Agent, or Firm* — Weaver Austin Villeneuve & Sampson LLP

(57) ABSTRACT

Techniques are described for reducing the delay between the live playhead of live streaming content and the client playhead of a client device consuming the live stream. In one technique, an increased playback speed is used by the media player on the client device so that the delay is gradually reduced. In another technique, the media player jumps forward in the stream, skipping content identified as expendable.

23 Claims, 5 Drawing Sheets

(56) References Cited

U.S. PATENT DOCUMENTS

| | | | |
|---|---|---|---|
| 2015/0229980 A1* | 8/2015 | Reisner | H04N 21/26233 725/32 |
| 2017/0085617 A1* | 3/2017 | Bovik | H04L 65/80 |
| 2017/0180824 A1* | 6/2017 | Casey | H04N 21/8352 |
| 2017/0353519 A1 | 12/2017 | McLeod | |

OTHER PUBLICATIONS

PCT International Search Report and Written Opinion, dated Jun. 26, 2017, issued in PCT/US2017/034066.

U.S. Office Action dated Apr. 6, 2018 issued in U.S. Appl. No. 15/170,169.

U.S. Notice of Allowance dated Jul. 25, 2018 issued in U.S. Appl. No. 15/170,169.

PCT International Preliminary Report on Patentability, dated Dec. 13, 2018, issued in PCT/US2017/034066.

* cited by examiner

CATCHING UP TO THE LIVE PLAYHEAD IN LIVE STREAMING

BACKGROUND

Live streaming content includes channels or feeds with scheduled content (e.g., premium movie channels) and live broadcasts (e.g., sporting events, news, etc.). Unlike video-on-demand (VOD) content, live streaming content often does not have a distinct end point and may continue indefinitely. In addition, VOD content may be buffered in client devices well in advance of the client playhead (i.e., the content fragment currently being rendered by the client). This is typically not the case for live content because of the constraint that the delay between the live playhead (i.e., the latest content fragment available) and the client playhead be as low as possible.

Because content services that provide live content often prioritize minimizing the delay between the live and client playheads, this has the potential to result in buffering events in which client devices run out of content fragments to play back. This is particularly the case for clients that maintain short buffers. Each buffering event for a given client device introduces additional delay between the live and client playheads (beyond the inherent latency associated with making the content available via a streaming protocol). For live content having a relatively long duration, e.g., a live sporting event, some client devices may fall several minutes behind the live playhead. Not only might this negatively affect viewer experience, it might also result in lack of compliance with the provisions of service level agreements.

DETAILED DESCRIPTION

Figure 1:
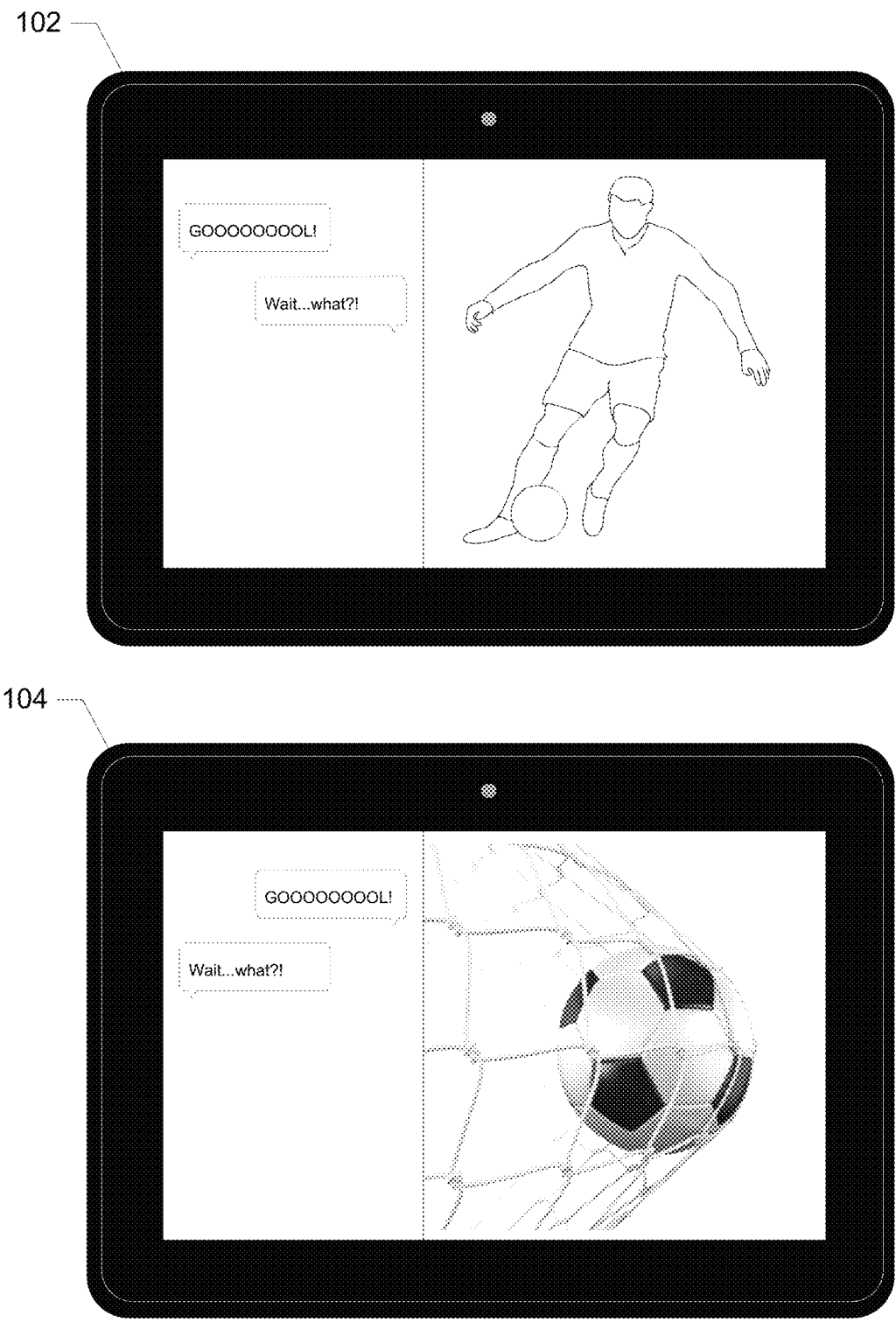
FIG. 1 is an illustration of a delay between the live and client playheads of a live content stream.

This disclosure describes techniques for reducing the delay between the live playhead of live streaming content and the client playhead of a client device consuming the live stream. In some cases, an increased playback speed is used by the media player on the client device so that the delay is gradually reduced. The increase in the playback speed is preferably small enough so that the faster playback is not perceptible to a human viewer. In other cases, the media player jumps forward in the stream, skipping content that is considered expendable, e.g., black frames, slate frames (e.g., an image with "please stand by" or "we'll be right back"), low-value advertising content, etc. Using these mechanisms separately or in combination, the client playhead may be brought closer in time to the live playhead. An example will be instructive.

Suppose two friends who are avid soccer fans are both watching live streams of the World Cup final match on their tablets while messaging each other. One of the friends on device 102 is using cellular data in a crowded public location to connect with the stream while the other on device 104 is using wifi on his home network. Because device 102 is competing for bandwidth with everyone else at its location it experiences multiple buffering events, and the client playhead falls behind that of his friend's device 104 which is consuming the stream with considerably more available bandwidth and is therefore much closer in time to the live playhead. When the viewer associated with device 104 triumphantly texts his friend as the ball hits the back of the net, the viewer associated with device 102 is understandably confused and frustrated. Using techniques enabled by the present disclosure, the delay resulting in this frustration can be significantly reduced or substantially eliminated.

Live streaming content is sometimes annotated with metadata in real time by human operators as the content is being generated. As part of this annotation, segments of the content may be identified by annotators as being expendable. For example, when the cameras at the event focus on the crowd or an aerial view of the surrounding geography rather than the pitch for a few seconds, or when play is stopped for an injury, such segments of the content can be identified by a human annotator as expendable. When the media player on client device 102 reaches such a point in the live stream, it can skip ahead to the next fragments in the stream that are not identified as expendable. In this way, the delay between the live playhead and the client playhead of device 102 can be shortened, reducing the likelihood of viewer frustration.

Alternatively or in conjunction with the skipping of content, the playback speed on device 102 can be increased for a period of time in a way that is not noticeable to the viewer to allow for a more gradual reduction in the delay between the live and client playheads. And if both client devices 102 and 104 are attempting to minimize this delay in similar fashion, it is much more likely that the respective viewers will be having viewer experiences that are more closely synchronized in time.

Figure 2:
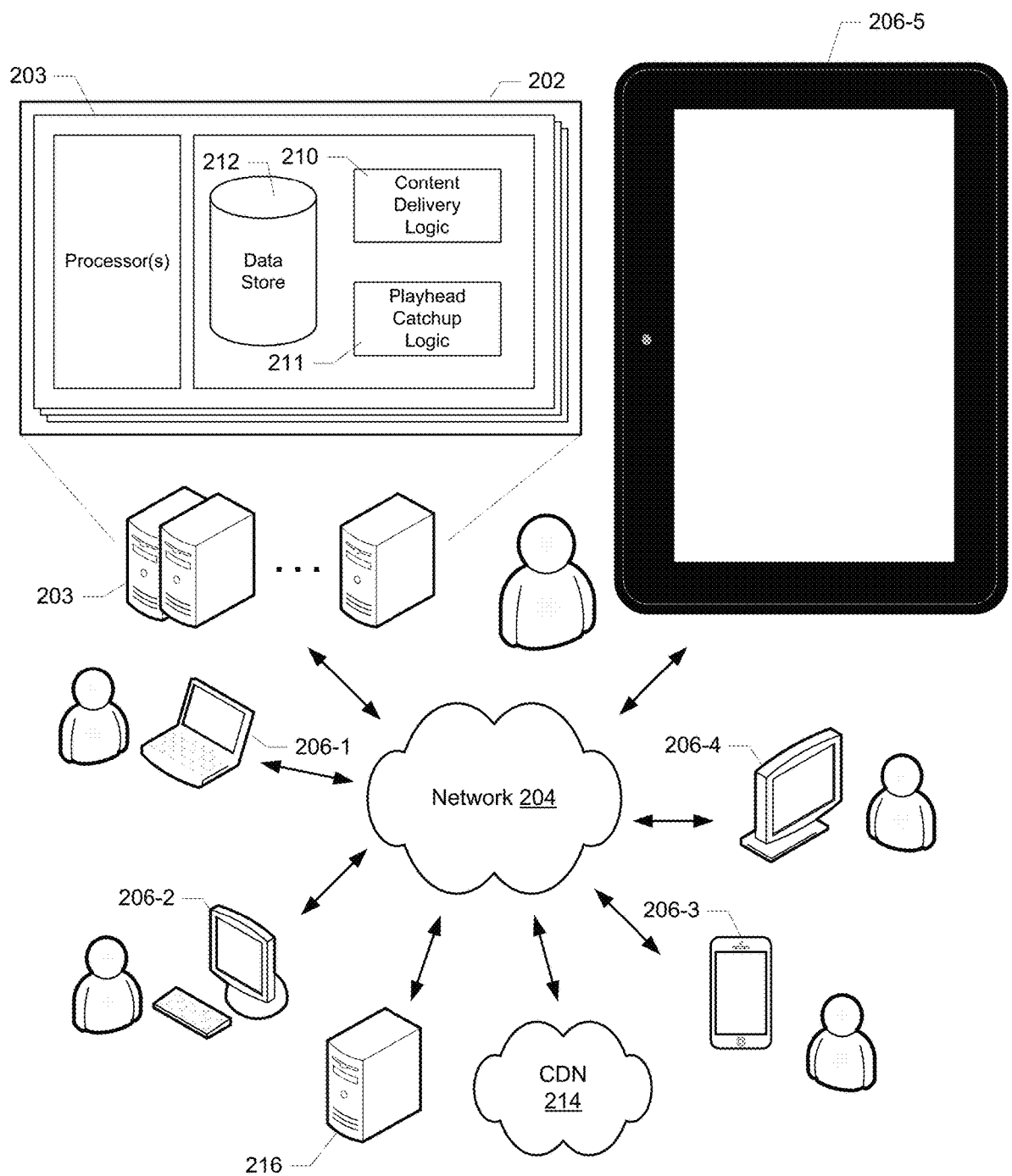
FIG. 2 is a simplified diagram of a computing environment in which implementations enabled by the present disclosure may be practiced.

FIG. 2 illustrates an example of a computing environment in which a video content service 202 provides live streaming content (e.g., audio or video) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it were integrated with the platform(s) that provides the live streaming content to client devices. However, it will be understood that content service 202 may provide access to live streaming content in conjunction with one or more content delivery networks (e.g., CDN 214) that may or may not be independent of content service 202. In addition, the source of the live content may or may not be independent of content service 202 (e.g., as represented by content provider server 216). The range of variations known to those of skill in the art are contemplated to be within the scope of this disclosure.

Some of the implementations enabled by the present disclosure contemplate logic resident on the client devices consuming live streaming content from content service 202; such logic being configured to make decisions in conjunction with consuming the video content such as, for example, monitoring the delay between playheads, increasing playback speed, and/or skipping expendable content. The logic might be part of an existing algorithm or module on the client device or implemented to work in conjunction with such an algorithm or module. The logic might be implemented, for example, in a media player on the client device or as a separate application or module resident on the client device.

It should also be noted that implementations are contemplated in which, in addition to content delivery logic 210 (which facilitates various aspects of content delivery to client devices 206), content service 202 may include logic that facilitates at least some aspects of monitoring and reducing the delay between playheads as described herein (e.g., as represented by playhead catchup logic 211). For example, such logic might be used to associate metadata with fragments or segments of the content that identify expendable content that can potentially be skipped to allow for reduction of the delay between the live playhead and client playheads. As discussed below, this may be done manually (e.g., by human operators), using existing content metadata, or by real-time analysis of the frames or fragments of the content. Such logic might also be configured to determine whether and how far a particular client is behind the live playhead and/or take steps or send instructions to the client (e.g., to initiate higher-speed playback or skipping of content) to support getting the client's playhead closer to the live playhead.

In addition to providing access to the live streaming content, content service 202 may also include a variety of information related to the live streaming content (e.g., other associated metadata and manifests in data store 212 to which service 202 provides access. Alternatively, such information about the live streaming content, as well as the live streaming content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
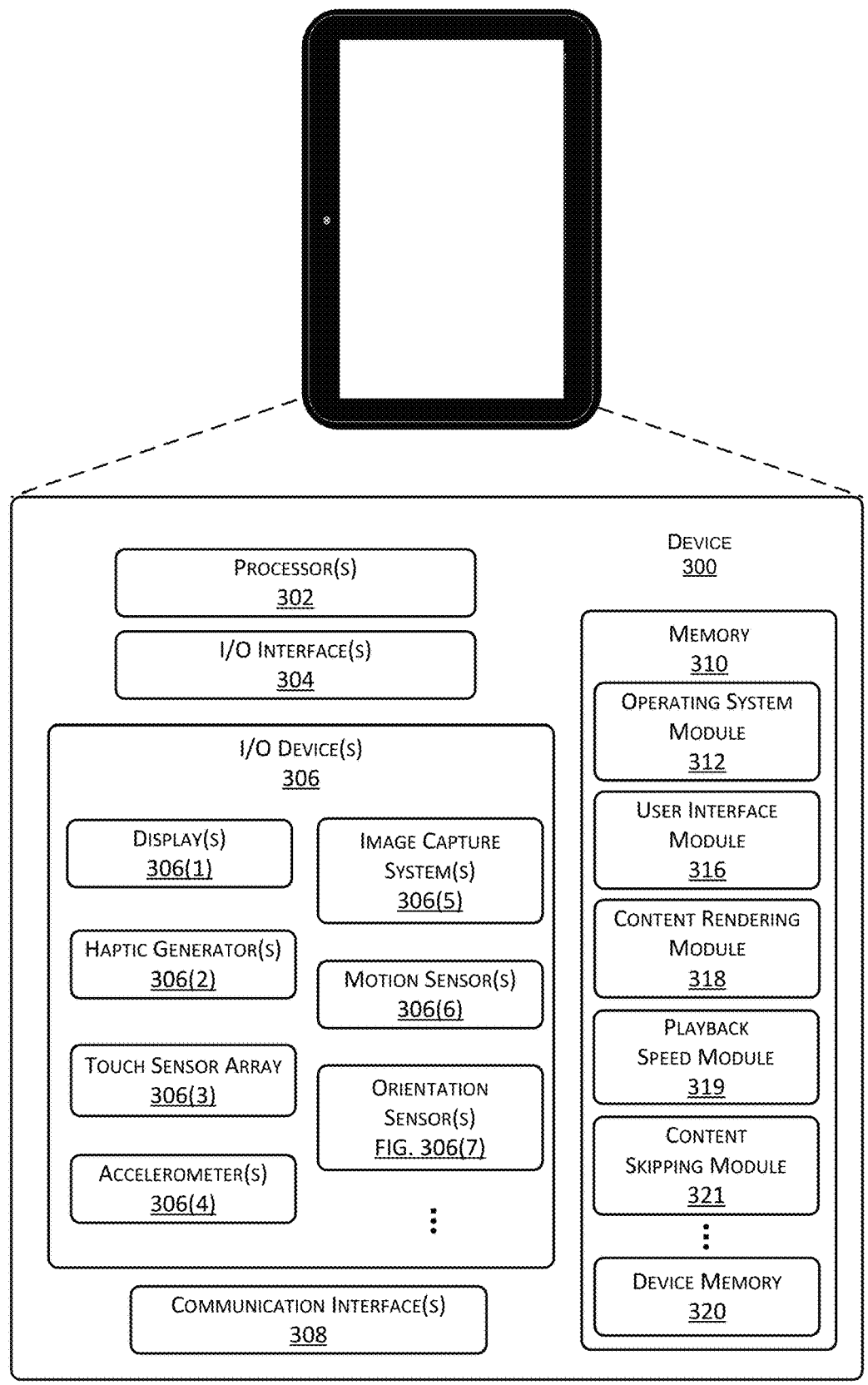
FIG. 3 is a simplified diagram of an example of a client device that may be used with implementations enabled by the present disclosure.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic or computer program instructions used to support reducing the delay between live and client playheads as described herein (represented by playback speed module 319 and content skipping module 321) may be implemented in a variety of ways. For example, at least some of this functionality may be implemented as part of the code of a media player operating on device 300. Alternatively, modules 319 and 321 may be implemented separately from and interact with the device's media player, web browser, mobile app, decoder, etc.

And as mentioned above, implementations are contemplated in which at least a portion of the logic or computer program instructions may reside on a separate platform, e.g., service 202, CDN 214, etc.; potentially working in conjunction with the client-side logic to reduce the delay between the respective playheads. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
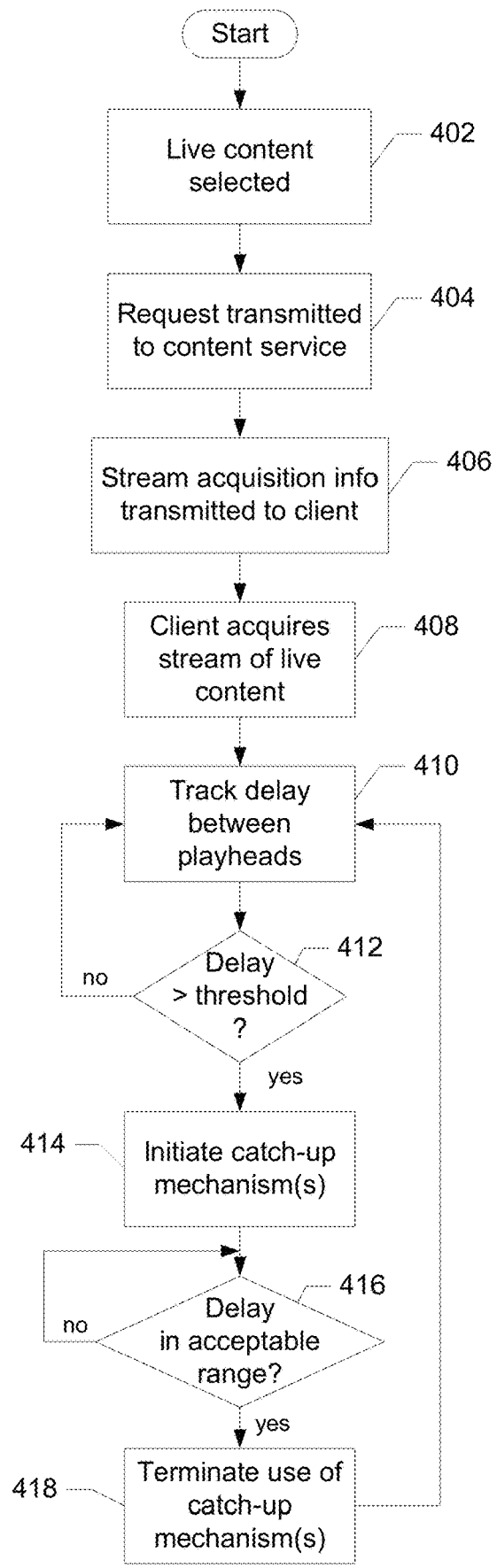
FIG. 4 is a flowchart illustrating operation of a particular implementation.

The delivery of live streaming content to a client device according to a particular implementation is illustrated in the flow chart of FIG. 4. This and other examples described herein assume the use of H.265 encoding (also commonly referred to as HEVC) for video content. However, it will be understood that the basic principles described herein may be employed with any of a variety of video and audio codecs including, for example, MPEG-1, MPEG-2, MPEG-4 Part 2, VC-1, H.263, VP8,VP9, Daala, and H.264. The example illustrated in FIG. 4 also assumes a media player on the client device that includes logic (e.g., modules 319 and 321) configured to manage at least some aspects of reducing the delay between the live and client playheads as described herein. Again, these details are merely presented by way of example.

When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. The live stream may also be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 4, when live content is selected in a user interface on a client device (402), a request for the content is sent to the corresponding content service (404). The content service provides the client device with the information the client device needs to acquire a stream of the content (406). This may include, for example, DRM licenses, a decryption key, content metadata, and information about where the client can request the fragments of the selected content at various resolutions (e.g., a manifest). The client device then acquires a stream of the live content using the information received from the content service (408).

As the client device is consuming the live content, the delay between the live playhead and the client playhead is tracked (410). This may be done in a variety of ways. For example, logic on the client device can count the cumulative amount of time required to recover from rebuffering events. In a simpler approach, a fixed amount of time could be added to the delay for each rebuffering event. In another example, time stamps associated with the recently requested fragments and representative of or close in time to the live playhead could be compared to a local clock on the client device.

In another example, the time reference used by logic on the client device to determine the delay could be a time stamp associated with one or more fragments acquired at the beginning of the session. For example, logic on the client could compare the difference between such a time stamp and that of a later fragment with actual time elapsed on the client device (e.g., as determined by a local clock) to determine the extent to which the delay has grown over time. In another example, server-side logic could determine the delay for a particular client by comparing the time stamp for a recently requested fragment by that client with the time stamp for the fragment most recently made available by the content service, or the latest fragment requested by any client consuming the live stream. Where server-side logic determines the delay for a particular client device, the server-side logic could also determine whether the delay exceeds a threshold and, when that occurs, transmit a message or an instruction to the client to initiate use of one or both of the catch-up mechanisms. Alternatively, the server-side logic could periodically transmit the delay to the client device for decision making on the client.

It should be noted that the delay value being tracked may only be an approximation of the actual delay between the live and client playheads. That is, both client and server-side logic might use time references that are suitable proxies for one or both of the playheads without departing from the scope of this disclosure. For example, the time stamp associated with a fragment most recently requested by a client device will likely differ from the time the fragment is actually rendered and displayed by the client device, but may otherwise be suitable for purposes of determining a reliable approximation of the actual delay. In another example, the time stamp associated with the fragment most recently made available by the content service might be earlier than the time at which the fragment becomes available to some client devices. More generally, and as will be appreciated by the diversity of the foregoing examples, there are many ways in which a delay between the live playhead and the client playhead for a particular client may be tracked, determined, or approximated for use as described herein. The scope of the present disclosure should therefore not be limited by reference to such examples.

Referring again to FIG. 4, if the delay between the live playhead and the client playhead exceeds a predetermined threshold (412), the operation of logic configured to reduce the delay is initiated (414). The threshold may be selected to keep the client device acceptably close to the live playhead while ensuring a particular level of content quality. The threshold might also be selected, at least in part, to ensure compliance with any applicable service level agreement(s). And as mentioned above, the logic initiated may be configured to increase the playback speed of the client device's media player, skip playback of expendable content, or use a combination of these "catch-up mechanisms." Once the delay is reduced to an acceptable level (416) (which may or may not be the same as the threshold used to trigger use of the catch up mechanism(s)), use of the catch-up mechanism(s) is/are terminated (418), and tracking of the delay continues (410).

Figure 5:
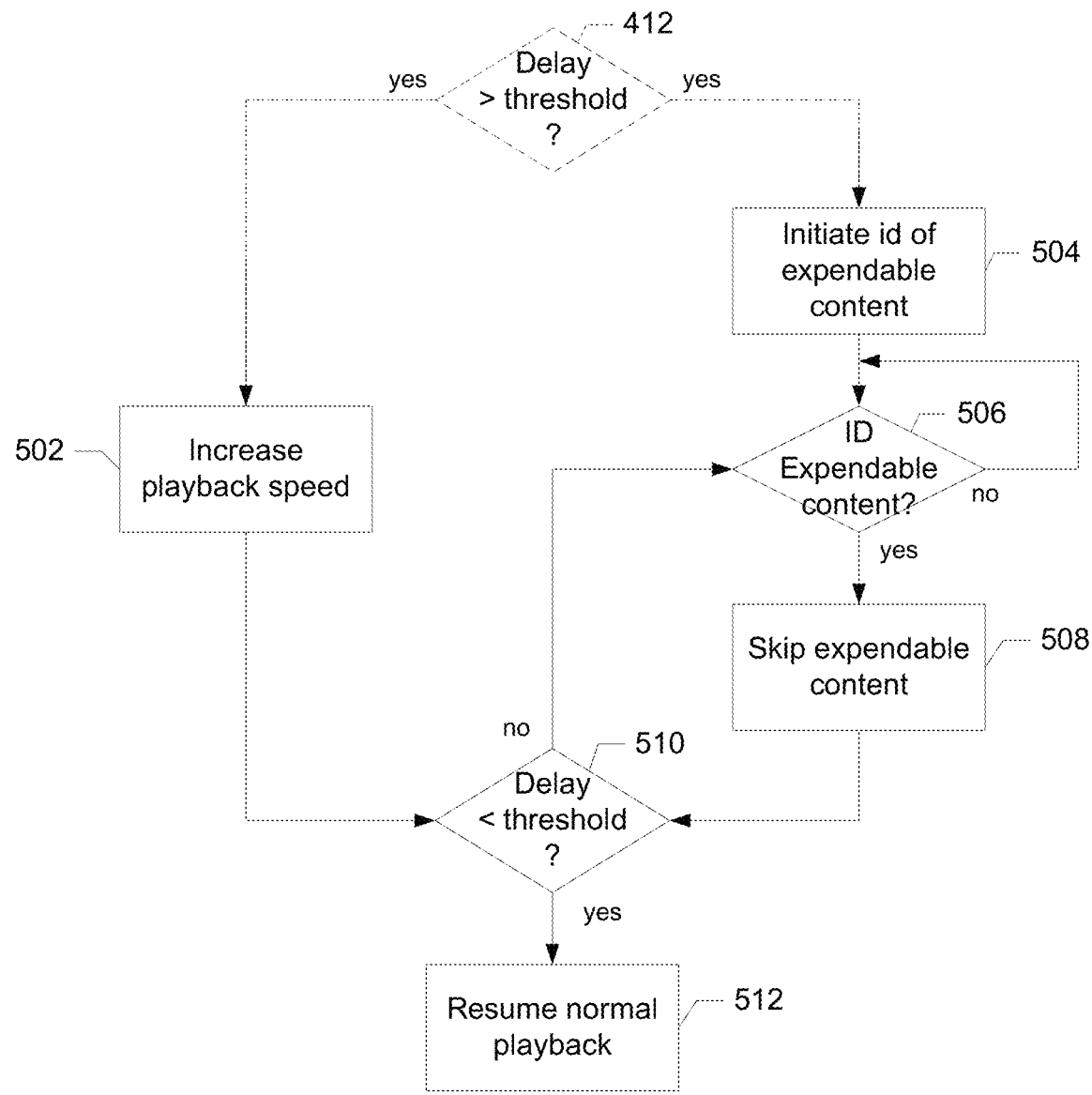
FIG. 5 is a flowchart illustrating operation of a particular implementation.

An example of the operation of an implementation that uses both of these mechanisms is illustrated in the flowchart of FIG. 5. According to the implementation depicted, when the delay between playheads exceeds the threshold (e.g., as determined in 412), the playback speed of the media player on the client device is increased (502). The amount by which the playback speed is increased may be relatively small, e.g., 2-5%, and potentially as much about 15%. For example, for a normal playback frame rate of 30 frames per second, the playback speed could be increased to 32 or 33 frames per second. Ideally, the increase in playback speed is imperceptible to most human viewers and may be empirically determined, e.g., using viewer assessment by human subjects.

It should be noted that the increase in playback speed may be at least partially dependent on the type of content. For example, humans may more readily distinguish an increase in playback speed for musical content than for content that is primarily visual in nature. So, for content that includes musical content (e.g., pure audio content, or video with significant musical content), the increase in playback speed may be lower than for some video content. And although it is preferable that the increase in playback speed be imperceptible to some, most, or all human viewers, implementations are contemplated in which this does not need to be the case.

According to some implementations, the increased playback speed may be a constant speed. Alternatively, implementations are contemplated in which the playback speed may vary dynamically. For example, if the increased playback speed is not successful in reducing the delay between the live and the client playheads after some programmable period of time, the playback speed might be further increased. In another alternative, the playback speed for different types of content may be different. For example, segments of the content that include musical content could be identified or detected (e.g., from content metadata) and the playback speed could be reduced for those segments while playback of segments not including musical content could be at a higher rate. In another alternative, different playback speeds might be used for different ranges of delay so as to enable faster catch-up for larger delays.

Increased playback speed or content skipping might also affect or interact with the operation of other logic on the client device such as, for example, adaptive bit rate selection logic. For example, such logic might be configured to request fragments at reduced quality when the media player is operating at a higher playback speed so that the high-speed playback can continue even if available bandwidth is low. Alternatively, increased playback speed and/or content skipping might be disabled where the content quality attainable by the adaptive bit rate selection logic is or would be negatively affected by the operation of the catch-up mechanisms (e.g., the video quality drops below a threshold). In some cases, the available bandwidth may be checked before initiating use of a catch-up mechanism to ensure playback quality. For example, if available bandwidth is below a certain level, increased playback speed may be disallowed or, if already started, suspended.

Referring back to FIG. 5, and in parallel with the increased playback speed, the identification of expendable content in the live stream is initiated (504). Each time one or more expendable content frames, fragments, or segments are encountered in the stream (506), playback of the expendable content is skipped (508). Such expendable content may correspond to any of a variety of breaks between the most relevant or interesting segments of the content such as, for example, black frames, slate frames, credits, opening or closing montages, commercial breaks, etc.

As mentioned above, such segments of content may be identified with reference to metadata that is introduced into the live stream (e.g., as metadata tags) by human operators in substantially real time. That is, human operators may view and annotate the live content (e.g., as it is received from the live content source) for a wide variety of purposes such as, for example, dynamic insertion of advertisements, providing additional descriptive content (e.g., sports play-by-play), rating of content for different viewing audiences, etc. According to some implementations, human operators annotate the live content by identifying expendable content, i.e., content for which playback may be skipped on client devices that are sufficiently behind the live playhead. So, for example, as a human operator is viewing the stream of a live sporting event close in time to the actual creation of the content, she can identify segments that correspond, for example, to views of the crowd, commercial breaks, replay reviews, etc., by inserting metadata tags into the stream that are associated with individual fragments, groups of fragments, or even longer segments. These tags may then be used (e.g., by content skipping module 321) to skip playback of the corresponding fragments.

In addition or as an alternative to being tagged by human operators, expendable content may be identified in a variety of other ways. For example and as mentioned above, expendable content might be identified using information about the content that is provided by the content provider. For example, content providers often provide information (e.g., content stream metadata) about events or breaks in content (e.g., commercial breaks, breaks between blocks of content, the beginning or end of scheduled content, the beginning of important live content, etc.) that may present opportunities for content skipping. Such events or breaks might include a fade to black, a few black frames, or content that is less important to viewers (e.g., commercial breaks, credits, etc.). And using such information for catching up to the live playhead may be advantageous in that there is a relatively high degree of reliability in the timing of such events as they are explicitly identified by the content provider. Further, for some types of live streams (e.g., streams of scheduled content), such events or breaks may be relatively far out into the future and thus may be communicated to the client well in advance.

In some implementations, the identification of expendable content may be based on real-time or near-real-time video inspection and analysis. For example, video fragments, GOPs, and individual video frames can be analyzed to determine whether they are black frames, or correspond to scenes in which the display images do not appreciably change for an extended period of time. As should be appreciated, such an approach may be particularly important for live streams that do not follow a strict schedule, e.g., live sporting events in which commercial breaks or the end of the program is determined by play on the field.

Identification of expendable content may be done by the client (e.g., content skipping module 321) with reference to either or both of information from the content provider (e.g., in stream metadata), or by inspection of the fragments or frames of the current stream as they are received. For example, the client might be configured to identify low-complexity or static content (e.g., by virtue of the relationships or dependencies among frames in a GOP). This might be done instead of or in addition to identification of expendable content on the server side (e.g., by playhead catchup logic 211).

Referring again to FIG. 5, the delay between the live and client playheads is monitored to determine whether operation of one or both of the catch-up mechanisms should be terminated. That is, for example, if the delay drops below a threshold (510), normal speed playback without content skipping may be resumed (512). The threshold used may be chosen to get the client playhead as close as possible to the live playhead without negatively affecting the user experience in terms of content quality and/or an unacceptably high rate of rebuffering events. The threshold might be the same as the one used to initiate operation of the catch-up mechanisms (e.g., 412 of FIG. 4). Alternatively, some level of hysteresis might be built into the system, using a lower threshold for termination of higher-speed playback or content skipping to ensure that the client isn't rapidly switching between normal playback and use of the catch-up mechanisms. Either or both thresholds might be dynamic in nature, depending, for example, on available bandwidth or a current state of an adaptive bit rate algorithm.

According to some implementations in which both catch-up mechanisms are employed, different thresholds may apply to initiation and termination of each mechanism. That is, increasing playback speed may allow for a finer control of the reduction of the delay between the live and client playheads as compared to the cruder but faster control represented by the skipping of content. Implementations are therefore contemplated in which the threshold(s) associated with increased playback speed is lower than the threshold(s) associated with content skipping. For example, the increase in playback speed might be initiated when the delay reaches 30 seconds, but content skipping might not be initiated until the delay reaches a minute or more. This allows for a more brute force approach (represented by content skipping) for longer delays, while allowing for a more fine-grained and precise approach (represented by higher-speed playback) for shorter delays.

And while the different catch-up mechanisms may be used in combination, they may or may not be used simultaneously. For example, the different mechanisms might be used alternatively, e.g., with content skipping being used until the delay has decreased sufficiently to allow for further reduction using higher-speed playback. Variations on this theme within the scope of the present disclosure will be understood by those of skill in the art.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:
   acquire a stream of live video content for playback on a client device;
   determine that a delay between a live playhead of the live video content and a client playhead associated with the playback of the live video content on the client device by a media player on the client device operating at a first number of frames per second exceeds a threshold;
   increase a playback speed of the live video content on the client device without skipping frames of the live video content by configuring the media player to render the live content at a second number of frames per second, thereby reducing the delay, wherein the increase in the number of frames per second is less than approximately 15% and is achieved without modifying encoding of the live video content, and wherein the increase in the number of frames per second reduces the delay between the live playhead and the client playhead;
   identify one or more expendable portions of the live video content;
   skip playback of at least one of the one or more expendable portions of the live video content, thereby reducing the delay;
   determine that the delay is below the threshold; and
   decrease the playback speed of the live video content by the media player on the client device to the first number of frames per second.

2. The computer program product of claim 1, wherein the one or more processors are configured to identify the one or more expendable portions of the live video content (1) using first content metadata associated with the live video content by a content provider in conjunction with generation of the live video content, (2) using second content metadata associated with the live video content by a human operator after generation of the live video content, or (3) by analyzing the live video content substantially in real time.

3. The computer program product of claim 1, wherein the one or more processors are further configured to determine the delay between the live playhead and the client playhead by determining a cumulative time for recovering from rebuffering events occurring on the client device.

4. A client device, comprising:
   memory;
   an output device; and
   one or more processors configured, in conjunction with the memory, to:
   acquire a stream of content for playback on the output device;
   determine that a delay between a live playhead of the content and a client playhead associated with the playback of the content exceeds a first threshold, the live playhead representing a latest content fragment of the content available; and
   increase a playback speed of the content without skipping frames of the content by modifying operation of a media player on the client device to increase a number of frames per second of the content rendered by the media player and displayed on the output device, wherein the increase in the number of frames per second is less than approximately 15% and is achieved without modifying encoding of the content, and wherein the increase in the number of frames per second reduces the delay between the live playhead and the client playhead.

5. The client device of claim 4, wherein the one or more processors are further configured to:
determine that the delay is below a second threshold, the second threshold being lower than the first threshold; and
decrease the playback speed of the content.

6. The client device of claim 4, wherein the one or more processors are further configured to:
determine that the delay exceeds a second threshold, the second threshold being higher than the first threshold; and
further increase the playback speed of the content.

7. The client device of claim 4, wherein the one or more processors are further configured to:
identify one or more expendable portions of the content; and
skip playback of at least one of the one or more expendable portions of the content.

8. The client device of claim 7, wherein the one or more processors are further configured to determine that the delay exceeds a second threshold, the second threshold being different from the first threshold, and wherein the one or more processors are configured to skip playback of at least one of the one or more expendable portions of the content in response to determining that the delay exceeds the second threshold.

9. The client device of claim 4, wherein the one or more processors are further configured to determine that there is sufficient available bandwidth for increasing the playback speed of the content.

10. The client device of claim 4, wherein the one or more processors are further configured to:
determine that available bandwidth or a playback quality of the content has dropped below a corresponding threshold; and
decrease the playback speed of the content.

11. The client device of claim 4, wherein the one or more processors are further configured to determine the delay based on a cumulative time for recovering from one or more rebuffering events.

12. A computer-implemented, comprising:
acquiring a stream of content for playback;
determining that a delay between a live playhead of the content and a client playhead associated with the playback of the content exceeds a delay threshold, the live playhead representing a latest content fragment of the content available; and
increasing a playback speed of the content without skipping frames of the content by modifying operation of a media player on a client device to increase a number of frames per second of the content rendered by the media player and displayed on an output device of the client device, wherein the increase in the number of frames per second is less than approximately 15% and is achieved without modifying encoding of the content, and wherein the increase in the number of frames per second reduces the delay between the live playhead and the client playhead.

13. The method of claim 12, further comprising:
determining that the delay is below a second threshold, the second threshold being lower than the first threshold; and
decreasing the playback speed of the content.

14. The method of claim 12, further comprising:
determining that the delay exceeds a second threshold, the second threshold being higher than the first threshold; and
further increasing the playback speed of the content.

15. The method of claim 12, further comprising:
identifying one or more expendable portions of the content; and
skipping playback of at least one of the one or more expendable portions of the content.

16. The method of claim 15, further comprising determining that the delay exceeds a second threshold, the second threshold being different from the first threshold, and wherein skipping playback of at least one of the one or more expendable portions of the content occurs in response to determining that the delay exceeds the second threshold.

17. The method of claim 12, further comprising determining that there is sufficient available bandwidth for increasing the playback speed of the content.

18. The method of claim 12, further comprising:
determining that available bandwidth or a playback quality of the content has dropped below a corresponding threshold; and
decreasing the playback speed of the content.

19. The method of claim 12, further comprising determining the delay based on a cumulative time for recovering from one or more rebuffering events.

20. A computer-implemented method, comprising:
receiving content from a live content source;
encoding the content for streaming to client devices; and
streaming the content to the client devices;
determining a delay between a live playhead of the content and a client playhead associated with the playback of the content on a first client device, the live playhead representing a latest content fragment of the content available; and
instructing the first client device to increase a playback speed of the content without skipping frames of the content by modifying operation of a media player on the first client device to increase a number of frames per second of the content rendered by the media player and displayed on an output device of the first client device, wherein the increase in the number of frames per second is less than approximately 15% and is achieved without modifying encoding of the content, and wherein the increase in the number of frames per second reduces the delay between the live playhead and the client playhead.

21. The method of claim 20, wherein determining the delay includes comparing a first time stamp associated with a first fragment of the content requested by the first client device with a second time stamp associated with a second fragment of the content available for streaming to the client devices, or with a third time stamp associated with a third fragment requested by one or more other client devices.

22. The client device of claim 7, wherein the one or more processors are configured to identify the one or more expendable portions of the content based on metadata associated with the one or more expendable portions of the content identifying the one or more expendable portions of the content as expendable.

23. The method of claim 15, wherein identifying the one or more expendable portions of the content is based on metadata associated with the one or more expendable portions of the content identifying the one or more expendable portions of the content as expendable.

* * * * *